United States Patent
Pismenny et al.

(10) Patent No.: US 12,259,963 B2
(45) Date of Patent: Mar. 25, 2025

(54) CONFIDENTIAL COMPUTING WITH DEVICE MEMORY ISOLATION

(71) Applicant: MELLANOX TECHNOLOGIES, LTD., Yokneam (IL)

(72) Inventors: Boris Pismenny, Haifa (IL); Miriam Menes, Tel Aviv (IL); Ahmad Atamli, Oxford (GB); Ilan Pardo, Ramat-Hasharon (IL); Ariel Shahar, Jerusalem (IL); Uria Basher, Ganei Tal (IL)

(73) Assignee: Mellanox Technologies, Ltd, Yokneam (IL)

( * ) Notice: Subject to any disclaimer, the term of this patent is extended or adjusted under 35 U.S.C. 154(b) by 300 days.

(21) Appl. No.: 17/676,890

(22) Filed: Feb. 22, 2022

(65) Prior Publication Data
US 2023/0267196 A1 Aug. 24, 2023

(51) Int. Cl.
*G06F 21/53* (2013.01)
*G06F 9/50* (2006.01)
*G06F 13/28* (2006.01)
*G06F 21/79* (2013.01)

(52) U.S. Cl.
CPC .......... *G06F 21/53* (2013.01); *G06F 9/5016* (2013.01); *G06F 9/5077* (2013.01); *G06F 13/28* (2013.01); *G06F 21/79* (2013.01)

(58) Field of Classification Search
CPC .......... G06F 21/53; G06F 21/79; G06F 21/78; G06F 9/5016; G06F 9/5077; G06F 13/28
See application file for complete search history.

(56) References Cited

U.S. PATENT DOCUMENTS

| | | | | |
|---|---|---|---|---|
| 2009/0113430 A1* | 4/2009 | Riley | ............... | G06F 21/606 710/316 |
| 2011/0145916 A1* | 6/2011 | McKenzie | ............ | G06F 21/79 718/1 |
| 2012/0047576 A1* | 2/2012 | Do | ................... | G06F 21/606 711/163 |
| 2012/0054744 A1* | 3/2012 | Singh | ............... | G06F 21/6218 718/1 |

(Continued)

OTHER PUBLICATIONS

Intel Corporation, "Intel Trust Domain Extensions," White Paper, pp. 1-9, Sep. 17, 2020.

(Continued)

*Primary Examiner* — Daniel B Potratz
*Assistant Examiner* — Taylor P Vu
(74) *Attorney, Agent, or Firm* — Meitar Patents Ltd.; Daniel Kligler (57) ABSTRACT

A confidential computing (CC) apparatus includes a CPU and a peripheral device. The CPU is to run a hypervisor that hosts one or more Trusted Virtual Machines (TVMs). The peripheral device is coupled to the CPU and to an external memory. The CPU includes a TVM-Monitor (TVMM), to perform management operations on the one or more TVMs, to track memory space that is allocated by the hypervisor to the peripheral device in the external memory, to monitor memory-access requests issued by the hypervisor to the memory space allocated to the peripheral device in the external memory, and to permit or deny the memory-access requests, according to a criterion.

14 Claims, 4 Drawing Sheets

(56) References Cited

U.S. PATENT DOCUMENTS

| | | | |
|---|---|---|---|
| 2012/0110181 A1* | 5/2012 | Tsirkin | G06F 9/4856 |
| | | | 709/226 |
| 2017/0180325 A1* | 6/2017 | Palermo | H04L 41/0894 |
| 2018/0150232 A1* | 5/2018 | Tsirkin | G06F 9/45558 |
| 2019/0109714 A1* | 4/2019 | Clark | H04L 67/565 |
| 2019/0243673 A1* | 8/2019 | Franciosi | G06N 20/00 |
| 2020/0202038 A1* | 6/2020 | Zhang | G16B 30/10 |
| 2020/0285594 A1* | 9/2020 | Busaba | G06F 12/1072 |
| 2021/0011984 A1* | 1/2021 | Renke | G06F 21/554 |
| 2023/0070125 A1* | 3/2023 | Evans | G06F 21/79 |

OTHER PUBLICATIONS

Advanced Micro Devices Inc., "AMD SEV-SNP: Srengthening VM Isolation with Integrity Protection and More," White Paper, pp. 1-20, Jan. 2020.

Advanced Micro Devices Inc, et al., "TEE Device Interface Security Protocol (TDSIP)", Draft PCI-SIG Engineering Change Notice, pp. 1-57, Dec. 1, 2020.

Ahmad et al., "Chancel: Efficient Multi-Client Isolation Under Adversarial Programs," Network and Distributed Systems Security (NDSS) Symposium, pp. 1-18, Feb. 21-25, 2021.

Hunt et al., "Confidential Computing for OpenPower," Proceedings of the Sixteenth European Conference on Computer Systems, pp. 294-310, Apr. 26-28, 2021.

\* cited by examiner

CONFIDENTIAL COMPUTING WITH DEVICE MEMORY ISOLATION

FIELD OF THE INVENTION

The present invention relates generally to confidential computing, and particularly to methods and systems for shared memory protection in confidential computing systems.

BACKGROUND OF THE INVENTION

Confidential computing is a technique aimed at protecting user data in computer systems.

In "CHANCEL: Efficient Multi-client Isolation Under Adversarial Programs," Ahmad et al., Network and Distributed Systems Security (NDSS) Symposium, Feb. 21-24, 2021, the authors assert that the Intel SGX aims to provide the confidentiality of user data on untrusted cloud machines. However, applications that process confidential user data may contain bugs that leak information or be programmed maliciously to collect user data. Existing research that attempts to solve this problem does not consider multi-client isolation in a single enclave. The authors show that by not supporting such in-enclave isolation, they incur considerable slowdown when concurrently processing multiple clients in different enclave processes, due to the limitations of SGX.

In "Confidential Computing for OpenPOWER," Hunt et al., Proceedings of the Sixteenth European Conference on Computer Systems (2021), pages 294-310, the authors present Protected Execution Facility (PEF), a virtual machine-based Trusted Execution Environment (TEE) for confidential computing on Power ISA. PEF enables protected secure virtual machines (SVMs). Like other TEEs, PEF verifies the SVM prior to execution. PEF utilizes a Trusted Platform Module (TPM), secure boot, and trusted boot as well as newly introduced architectural changes for Power ISA systems.

In a white paper titled "AMD SEV-SNP: Strengthening VM Isolation with Integrity Protection and More" (AMD corporation, January 2020), the authors introduce Secured Encrypted Virtualization-Secure Nested Paging (SEV-SNP), which combines virtual machine (VM) isolation from the hypervisor (SEV) and hardware-based security protection (SNP).

In a white paper titled "Intel® Trust Domain Extensions" (Intel 0920/RR/MESH/PDF 343961-002YS, 2020) the authors describe architectural elements to deploy hardware-isolated virtual machines called Trust Domains (TDs), which are a part of Intel Trust Domain Extensions (TDX). Intel TDX is designed to isolate VMs from the virtual machine manager (VMM)/hypervisor.

SUMMARY OF THE INVENTION

An embodiment that is described herein provides a confidential computing (CC) apparatus including a CPU and a peripheral device. The CPU is to run a hypervisor that hosts one or more Trusted Virtual Machines (TVMs). The peripheral device is coupled to the CPU and to an external memory. The CPU includes a TVM-Monitor (TVMM), to perform management operations on the one or more TVMs, to track memory space that is allocated by the hypervisor to the peripheral device in the external memory, to monitor memory-access requests issued by the hypervisor to the memory space allocated to the peripheral device in the external memory, and to permit or deny the memory-access requests, according to a criterion.

In some embodiments, the memory-access requests include Direct Memory Access (DMA) accesses to the external memory. In an embodiment, in accordance with the criterion, the TVMM is to permit only memory-access requests to the memory space allocated to the peripheral device that originate from the peripheral device, and deny memory-access requests to the memory space allocated to the peripheral device that do not originate from the peripheral device. In another embodiment, in accordance with the criterion, the TVMM is to decide whether to permit or deny a memory-access request based on (i) an address in the external memory that is accessed by the memory-access request, and (ii) an identifier that is specified in the memory-access request and identifies a software that originated the memory-access request.

There is additionally provided, in accordance with an embodiment that is described herein, a confidential computing (CC) apparatus including a CPU and a peripheral device. The CPU is to run a hypervisor that hosts one or more Trusted Virtual Machines (TVMs). The peripheral device is coupled to the CPU and to an external memory. The CPU is further to run an Device TVM (DTVM) that is to perform management operations on the one or more TVMs, to receive from the hypervisor allocations of memory space for the peripheral device in the external memory, to allocate the memory space to the peripheral device in the external memory in response to the allocations, to monitor memory-access requests issued by the hypervisor to the memory space allocated to the peripheral device in the external memory, and to permit or deny the memory-access requests in accordance with a criterion.

In some embodiments, the CPU is to attest the DTVM when the peripheral device accesses the external memory. In an embodiment, in accordance with the criterion, the DTVM is to permit only memory-access requests to the memory space allocated to the peripheral device that originate from the peripheral device, and deny memory-access requests to the memory space allocated to the peripheral device that do not originate from the peripheral device. In another embodiment, in accordance with the criterion, the DTVM is to decide whether to permit or deny a memory-access request based on (i) an address in the external memory that is accessed by the memory-access request, and (ii) an identifier that is specified in the memory-access request and identifies a software that originated the memory-access request.

There is further provided, in accordance with an embodiment that is described herein, a confidential computing (CC) method including running, in a CPU, a hypervisor that hosts one or more Trusted Virtual Machines (TVMs). Using a TVM-Monitor (TVMM) running in the CPU, management operations are performed on the one or more TVMs; memory space, which is allocated in an external memory to a peripheral device by the hypervisor, is tracked; memory-access requests, issued by the hypervisor to the memory space allocated to the peripheral device in the external memory, are monitored; and the memory-access requests are permitted or denied according to a criterion.

There is also provided, in accordance with an embodiment that is described herein, a confidential computing (CC) method including running, in a CPU, a hypervisor that hosts one or more Trusted Virtual Machines (TVMs). Using a Device TVM (DTVM) running in the CPU, management operations are performed on the one or more TVMs; allocations of memory space in an external memory, for a peripheral device, are received from the hypervisor; the memory space is allocated to the peripheral device in the external memory in response to the allocations; memory-access requests, issued by the hypervisor to the memory space allocated to the peripheral device in the external memory, are monitored; and the memory-access requests are permitted or denied in accordance with a criterion.

There is additionally provided, in accordance with an embodiment that is described herein, a confidential computing (CC) method including running, in a CPU, a hypervisor that hosts one or more Trusted Virtual Machines (TVMs). A Device TVM (DTVM) or TVM-Monitor (TVMM) running in the CPU monitors memory-access requests issued by the hypervisor to a memory space allocated to a peripheral device in an external memory. The memory-access requests are permitted or denied according to a criterion.

The present invention will be more fully understood from the following detailed description of the embodiments thereof, taken together with the drawings in which:

DETAILED DESCRIPTION OF EMBODIMENTS

Overview

Confidential Computing (CC) is a computing technology that isolates sensitive data in a protected CPU enclave during processing. Multiple programs typically run on Trusted Virtual Machines (TVMs) and are isolated from each other. In some system, a zero-trust approach is taken, and no software can be trusted, including the hypervisor and the core operating system.

When a peripheral device is embedded in a CC system (for example, a network device, providing the system with network communication), and allowed access to the system memory, the isolation scheme should be extended to include memory that is allocated to the device. (We assume below that sensitive computer programs such as TVMs comprise inherent protection of working registers, e.g., flush all register when switched from, and hence, the term "isolation" used hereinbelow will refer to isolation of memory segments that are allocated to the TVMs, to the device software and to the hypervisor.) Embodiments according to the present invention that are disclosed herein provide for CC systems that include one or more peripheral devices; the peripheral devices are not trusted, and do not trust the TVMs and/or the hypervisor. In embodiments, memory that is allocated to a peripheral device is isolated from memory that is allocated to the TVMs and from memory that is allocated to the hypervisor (the group that may receive memory allocation, including the TVMs, the hypervisor and the device, will be referred to as "the clients" hereinbelow).

In some embodiments, the CC system includes a TVM-Monitor (TVMM) circuit. The TVMM is configured to isolate memory that is allocated to the various clients from each other. In an embodiment, the TVMM monitors and records memory allocations to the clients, and then checks memory accesses to verify that no client will access memory segments that are not allocated to the client.

In other embodiments, the CC provides hardware isolation between TVMs and the hypervisor. To extend the isolation, a Device-TVM (DTVM) software is used, which interfaces with the peripheral device, but, in all other respects, may be regarded as a TVM (that is—the DTVM-hypervisor communication interface is indistinguishable from any TVM-hypervisor communication interface). Thus, the inter-TVM and TVM-hypervisor isolation provided by the CC system can be extended to include memory allocation to the peripheral device.

System Description

Confidential Computing (CC) techniques isolate memory spaces allocated to concurrent Virtual Machines (VMs) from each other, and from the hypervisor, which can allocate memory to the VMs but then cannot access the allocated memory. Such protected virtual machines are referred to as Trusted Virtual Machines (TVMs).

CC systems may include, in addition to one or more processors that run the hypervisor and the TVMs, peripheral devices to perform auxiliary tasks; for example, the CC may comprise a network device to facilitate network communication by the TVMs. When the peripheral device uses a shared system memory, the isolation should be preserved. For example, when a TVM communicates data over the network, a network device may temporarily store part of the data in system memory; it is imperative that such data be isolated from TVMs and from the hypervisor.

Figure 1:
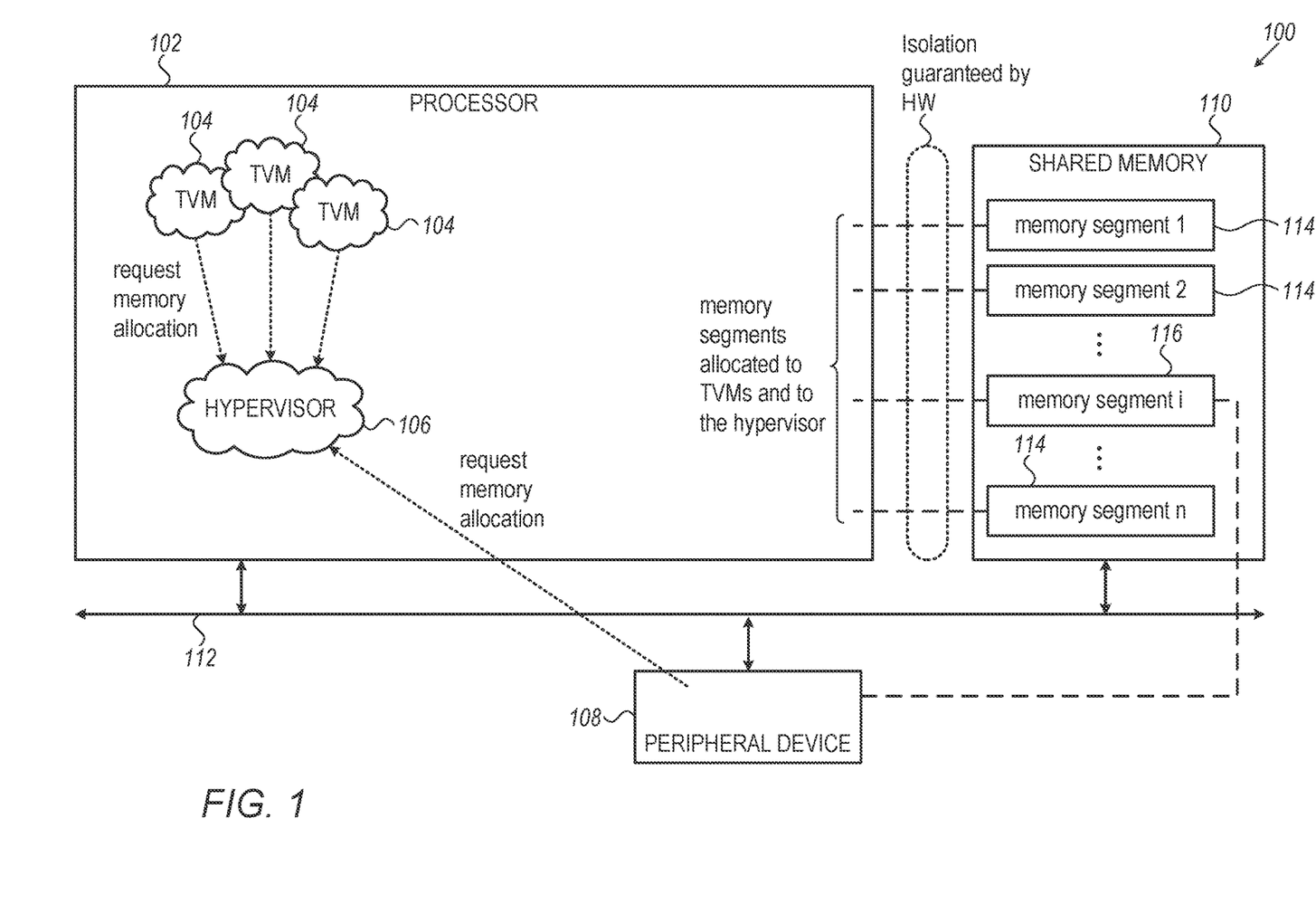
FIG. 1 is a block diagram that schematically illustrates a confidential computing (CC) system, in accordance with an embodiment of the present invention.

FIG. 1 is a block diagram that schematically illustrates a CC system 100, in accordance with an embodiment of the present invention. A processor 102 runs a plurality of confidential computing tasks, in a plurality of Trusted Virtual Machines (TVMs) 104; the TVMs are isolated from each other and from an underlying hypervisor 106.

CC system 100 further comprises a peripheral device 108 (e.g., a network device) and a shared memory 110. the processor, the network device and the memory are connected to each other by a system bus 112—for example, a Peripheral Component Interconnect express (PCIe) bus.

Some (or all) the TVMs may be allocated segments 114 in the shared memory. In embodiments, the hypervisor allocates memory segments to TVMs (upon initialization and/or upon allocation request); however, once the hypervisor allocates memory to a TVM, the hypervisor is unable to access the allocated segments or to re-allocate an allocated memory segment to another TVM—until the TVM to which the segment is allocated releases the segment. Processor 102, therefor, isolates segments 114 from each other—and from the hypervisor (the hypervisor may shutdown the TVM, but that would not jeopardize security).

According to the example embodiment illustrated in FIG. 1, device 108 may request (from the hypervisor) memory allocation and may be allocated segments in the shared memory—e.g., a segment 116. As data that the device stores in the shared memory may comprise confidential TVM data (e.g., the contents of a packet that a TVM communicates over a network through the device), processor 102 isolates the contents of memory segment 116 from other memory segments and from the hypervisor.

Thus, according to the example embodiment illustrated in FIG. 1 and described hereinabove, processor 102 runs confidential computing by executing computation tasks in TVMs, allocating memory segments to TVMs and to devices, and providing complete isolation of the memory segments, including protection from access by the hypervisor.

The configuration of CC system 100 illustrated in FIG. 1 and described above is cited by way of example. Other suitable configurations may be used in alternative embodiments. For example, in some embodiments, a plurality of devices may be used. In other embodiments, the CC comprises a plurality of processors that run a single or multiple hypervisors.

Figure 2:
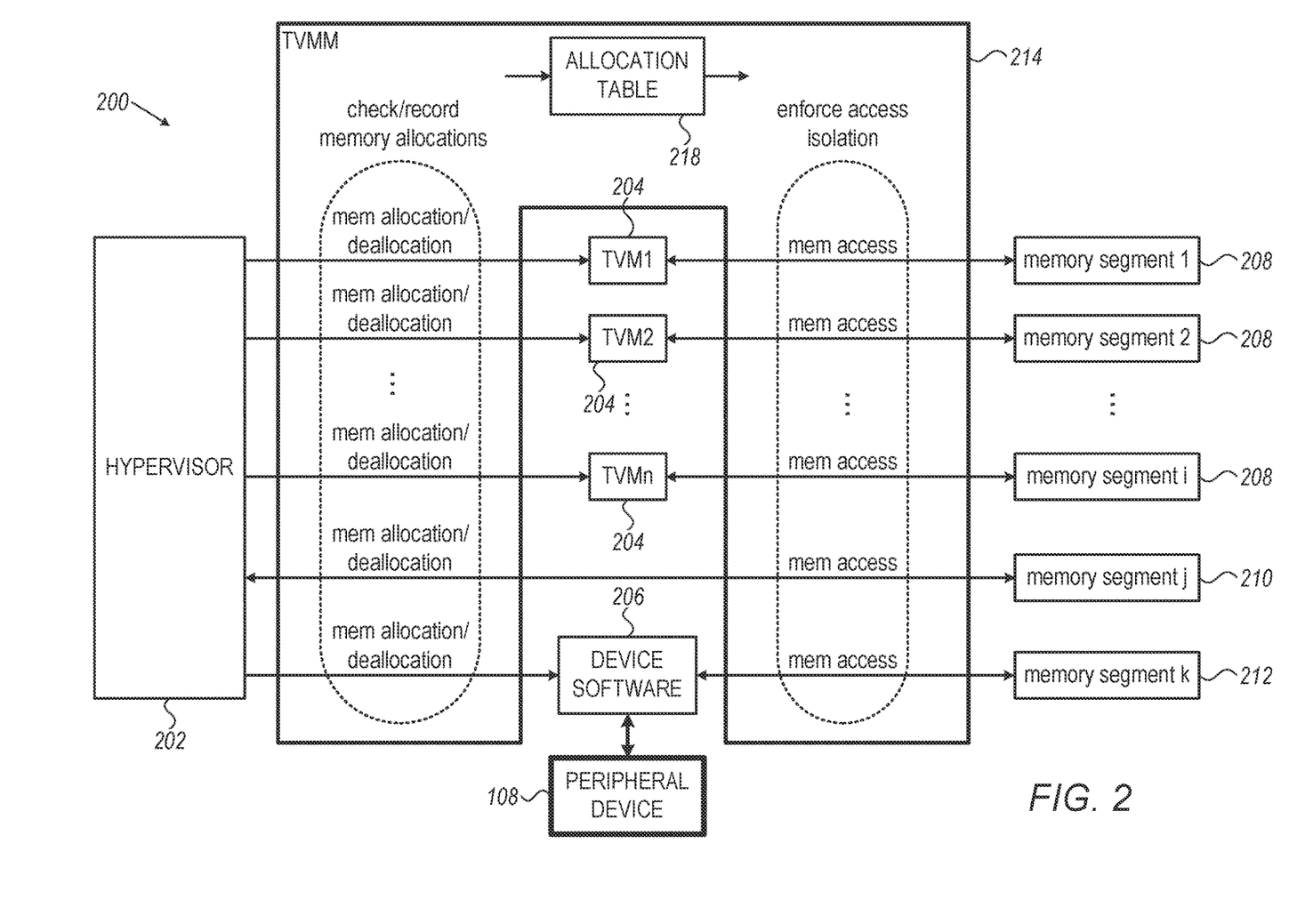
FIG. 2 is a block diagram that schematically illustrates the structure of a hardware device-memory-isolation CC system, in accordance with an embodiment of the present invention.

In some embodiments, the processor comprises circuitry to isolate between address spaces of TVMs, of one or more devices, and of the hypervisor and a Trusted Security Environment Security Manager (TSM) that enforces security policies in the processor. FIG. 2 is a block diagram that schematically illustrates the structure of a hardware device-memory-isolation CC system 200, in accordance with an embodiment of the present invention. CC system 200 comprises the following software modules: a Hypervisor 202, one or more TVMs 204 and a device software 206, which interfaces with peripheral device 108 (FIG. 1).

According to the example embodiment illustrated in FIG. 2, CC system 200 further comprises a TVM-Monitor (TVMM) circuit 214, which ensures confidential computing by checking allocation of memory segments by the hypervisor and by monitoring and checking all accesses to the shared memory.

The hypervisor allocates memory segments 208 to TVMs, a memory segment 210 to the hypervisor and a memory segment 212 to the device software. Allocation can be static, done when a TVM is initialized, or dynamic, responsive to memory allocation request. We will refer hereinbelow to all entities that may require system memory allocation (e.g., the TVMs, the device software and the hypervisor) as clients. A client may also release allocated memory, in which case the hypervisor deallocates the released memory from the TVM and may then reallocate the released memory to other clients (in embodiments, a TVM erases all segment data prior to the release of the segment, for better security).

TVMM 214 receives allocation and deallocation messages that the hypervisor sends to clients and checks that the allocations do not collide (that is, that a given memory segment is not allocated to more than one client); if the TVMM finds a collision, the TVMM alerts the TSM, and ignores the allocation.

Responsively to the non-colliding allocations and to the deallocations, the TVMM updates an allocation table 218. The allocation table comprises, for each client, a list of memory segments that the client is allowed to access (in some embodiments, the allocation table comprises addresses of segment boundaries). When any client accesses a segment in the shared memory, the TVMM checks if the client is allowed to access the memory segment (it should be noted that, when monitoring accesses to the shared memory, the TVMM typically monitors DMA transactions on the system bus). If the access is not allowed, the TVMM will block the access and, typically, alert a user.

Thus, according to the example embodiment illustrated in FIG. 2 and described hereinabove, a TVMM circuit in the CC system monitors and records memory allocations, indicates duplicate or overlapping allocations, and then, using the recorded allocations, ensures clients isolation, including isolation of TVMs memory, device memory and hypervisor memory.

The configuration of hardware device-memory-isolation CC system 200 illustrated in FIG. 2 and described hereinabove is an example that is cited merely for conceptual clarity. Other suitable configurations may be used in alternative embodiments. For example, in some embodiments, each TVM may be allocated more than one memory segment, or no memory segments. In embodiments, there may be more than one instance of device software. In other embodiments, some or all of memory segments 208, 210, 212 may be cached in an internal processor memory, and, hence, the TVMM purges the relevant cache entries when a segment is deallocated.

Figure 3:
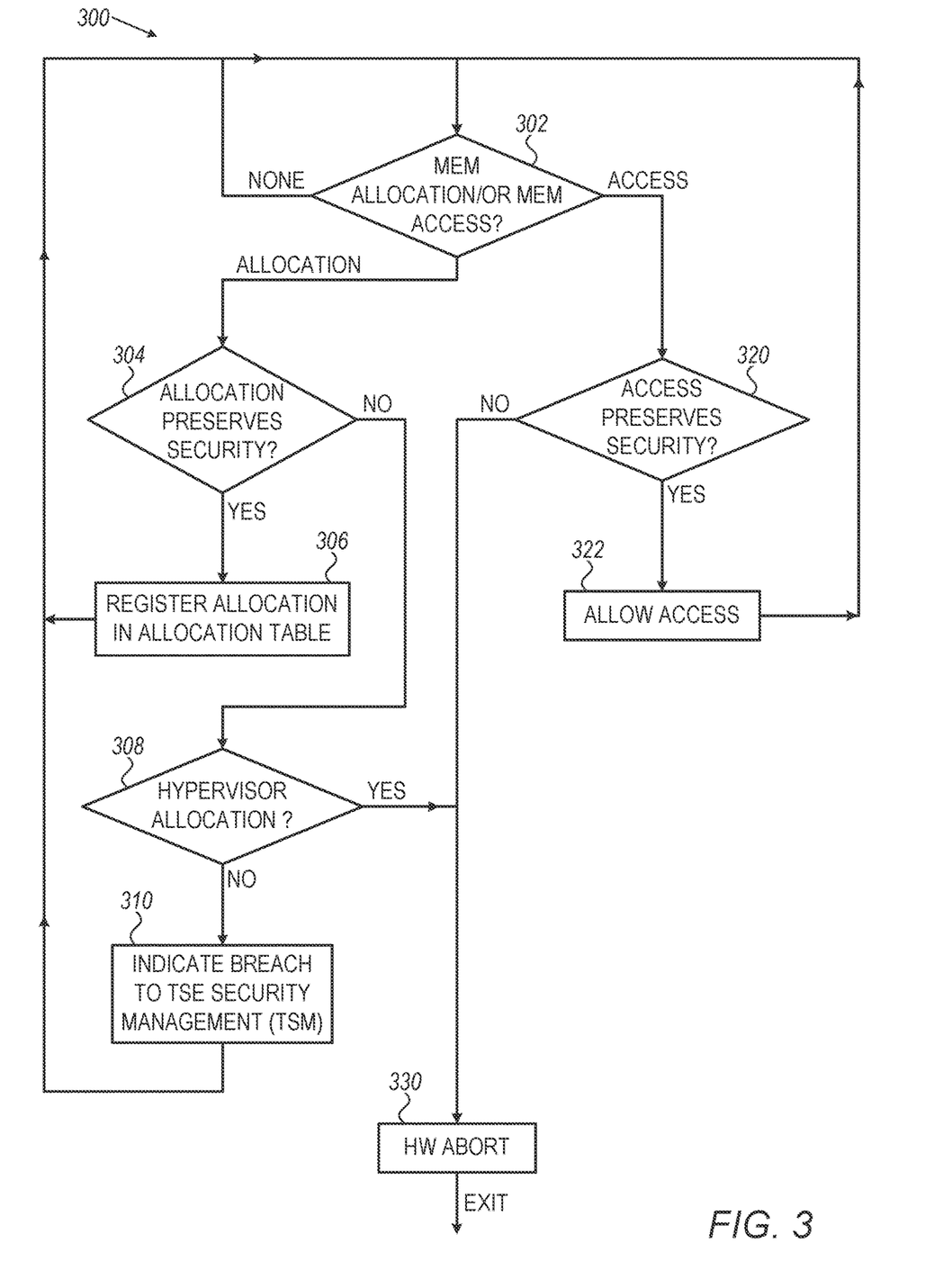
FIG. 3 is a flowchart that schematically illustrates a method for device-memory-isolation using hardware circuitry, in accordance with an embodiment of the present invention.

FIG. 3 is a flowchart 300 that schematically illustrates a method for device-memory-isolation using hardware circuitry, in accordance with an embodiment of the present invention. The flowchart is executed by TVMM 214 (FIG. 2).

Flowchart 300 starts at a check allocation/access step 302, wherein the TVMM waits to be activated, by either a memory allocation or by a memory access. In embodiments, the TVMM detects memory allocations and deallocations by monitoring system calls of the hypervisor and detects memory accesses by monitoring the PCIe activity. The TVMM remains at step 302 until either a memory allocation/deallocation or a memory access is detected.

If, in step 302, a memory allocation (or deallocation) is detected, the TVMM enters a check-allocation-security step 304 to verify that the allocation does not breach the confidentiality. To this end, the TVMM may read allocation table 218 (FIG. 2) and check that the allocated memory segment is not already allocated to an active client. If the allocation does not breach the confidentiality the TVMM enters a register-allocation step 306, registers the allocation (e.g., in allocation table 218), and then reenters step 302, to wait for the next TVMM activation.

If, in step 304, the TVMM determines that the allocation does breach the security (e.g., the allocation collides with a previous allocation), the TVMM enters a check-hypervisor-allocation step 308 and checks if the breaching allocation pertains to hypervisor memory allocation. If the breaching allocation does not pertain to the hypervisor memory allocation (e.g., the breaching allocation pertains to a TVM or to the device software), the TVMM will enter an indicate-breach step 310, notify the TSM that a breach has been detected, and then reenter step 302 to wait for the next TVMM activation.

If, in step 302, a memory access is detected, the TVMM will enter a check-access-security step 320 to verify that the access is allowed, by comparing the accessed memory segment to a range of allowed memory segments for the accessing client (according to the list that is stored in allocation table 218). If the access is secure, the TVMM will enter an allow-access step 322, allow the access, and then reenter step 302 to wait for the next TVMM activation.

As discussed above, memory isolation must be preserved for all clients, including the hypervisor. However, if the TVMM detects a confidentiality breach pertaining to the hypervisor, the TVMM cannot trust the hypervisor to handle the breach. According to the example embodiment illustrated in FIG. 3, if, in step 308, the allocation breach pertains to allocation of hypervisor memory, or if, in step 320, the hypervisor (or a VM) attempts to read a segment of memory that is not allocated to the hypervisor, the TVMM enters a hardware-abort step 330 and aborts the processor.

The configuration of flowchart 300 illustrated in FIG. 3 and described hereinabove is cited by way of example. Other suitable configurations may be used in alternative embodiments. For example, in some embodiments all illegal accesses result in a hardware abort. In other embodiments, flowchart 300 is split to two concurrent flowcharts—a first flowchart to monitor allocations and a second flowchart to monitor and block accesses.

Figure 4:
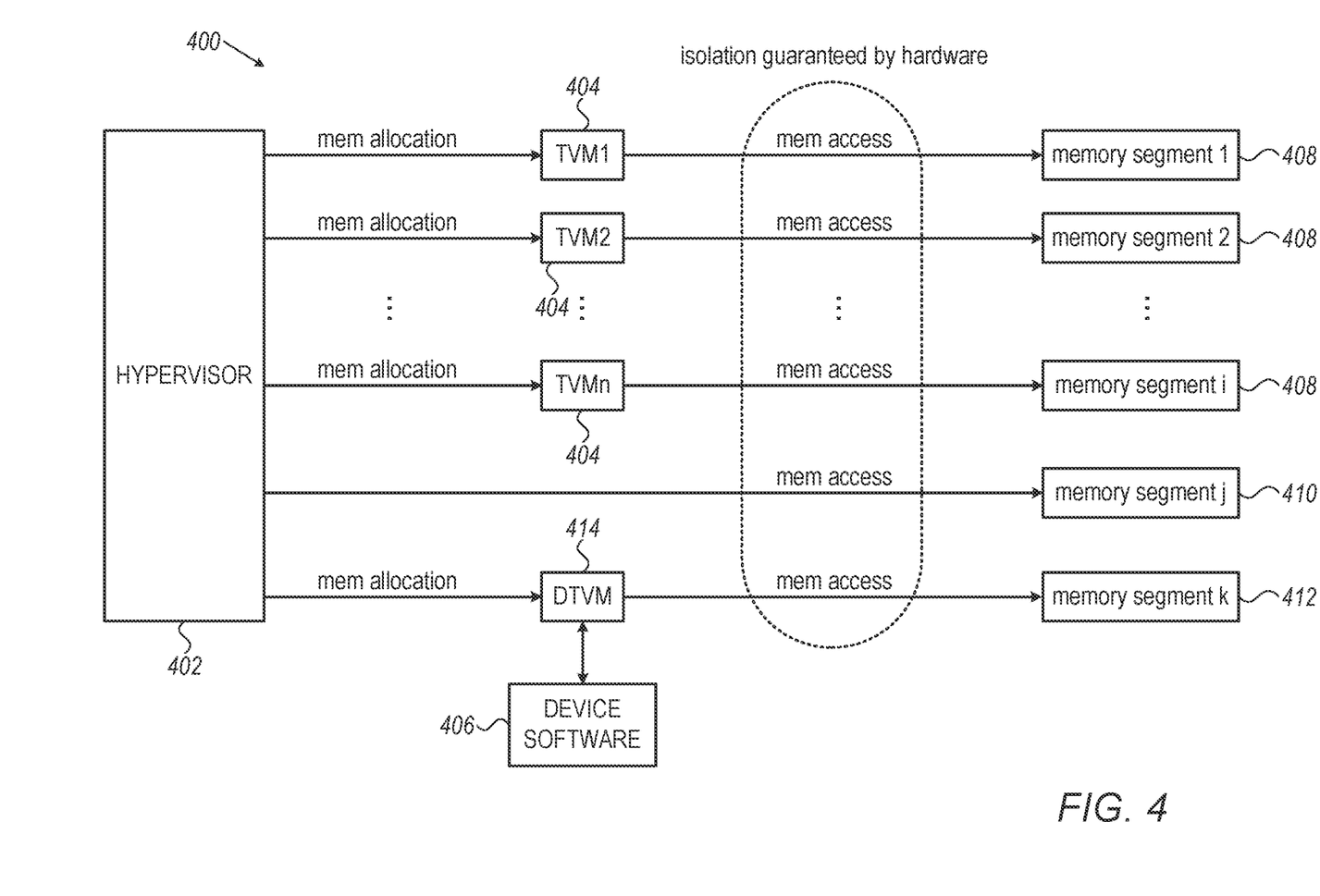
FIG. 4 is a block diagram that schematically illustrates the structure of a software device-memory-isolation CC system, in accordance with an embodiment of the present invention.

FIG. 4 is a block diagram that schematically illustrates the structure of a software device-memory-isolation CC system 400, in accordance with an embodiment of the present invention. According to the example configuration illustrated in FIG. 4, processor 102 (FIG. 1) is configured to provide isolation of memory segments that are allocated to TVMs and to the hypervisor but is not configured to provide isolation of memory allocated to the device software.

CC system 400 comprises a hypervisor 402, one or more TVMs 404, a device-software 406, memory segments 408 that are allocated to the TVMs, a memory segment 410 that is allocated to the hypervisor, and a memory segment 412 that is allocated to the device software.

According to the example embodiment illustrated in FIG. 4, CC system 400 further comprises a device-trusted-virtual-machine (DTVM) 414. The DTVM is a software device driver, which comprises the same hypervisor interface that the TVMs comprise, and, hence, perceived by the hypervisor as a TVM. The DTVM, however, further comprises interface to the device software (which, in turn, interfaces with peripheral device 108, FIG. 1).

In embodiments, the DTVM protection mechanism relies on two enabling technologies: (i) CPU TVM technology to protect device data from the hypervisor and other TVMs; and, (ii) Trusted device memory protection that ensures TVM DMA requests are isolated from each other (the TVM's trust of the device is required so that the device could access TVM data).

Hypervisor 402 handles DTVM 414 as any other TVM, obliviously to the interface between the DTVM and the device software. Thus, memory segment 412, which is allocated to the device (via the DTVM) is isolated from all TVMs and from the hypervisor; similarly, memory segments allocated to the hypervisor and to the TVMs are isolated from the DTVM.

In summary, according to the example embodiment illustrated in FIG. 4, device memory isolation is achieved by a DTVM that interfaces with the device software. To the hypervisor, the DTVM is indistinguishable from a TVM, and, thus, device memory accesses are fully isolated.

The configuration of software device-memory-isolation CC system 400 illustrated in FIG. 4 and described hereinabove is an example that is cited for the sake of conceptual clarity. Other suitable configurations may be used in alternative embodiments. For example, in some embodiments, a plurality of devices may be supported by a plurality of DTVMs. In other embodiments, a single DTVM may be used, supporting a plurality of devices.

The configuration of CC system 100, including processor 102, TVMM 214, DTVM 414 and the method of device memory isolation 300, are example configurations and methods that are shown purely by way of illustration. Any other suitable configurations and methods can be used in alternative embodiments.

In various embodiments, processor 100, and/or TVMM 214 described hereinabove may be carried out by hardware, by software, or by a combination of hardware and software.

In various embodiments, the different elements of processor 102 and TVMM 214, may be implemented using suitable hardware, such as one or more Application-Specific Integrated Circuits (ASIC) or Field-Programmable Gate Arrays (FPGA), or a combination of ASIC and FPGA.

CC system 100 may include one or more processors; the processors typically comprise one or more general-purpose processors, which are programmed in software to carry out at least part of the functions described hereinabove. The software may be downloaded to the processor in electronic form, over a network, for example, or it may, alternatively or additionally, be provided and/or stored on non-transitory tangible media, such as magnetic, optical, or electronic memory.

Although the embodiments described herein mainly refer to device memory isolation in confidential computing, the methods and systems described herein can also be used in other applications.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A confidential computing (CC) apparatus, comprising:
    a CPU, to run a hypervisor that hosts one or more Trusted Virtual Machines (TVMs); and
    a network device coupled to the CPU and to an external memory, for providing network communication to the CC apparatus,
    wherein the CPU comprises a TVM-Monitor (TVMM) distinct from the hypervisor to:
        perform management operations on the one or more TVMs;
        track allocation messages of memory space that is allocated by the hypervisor in the external memory to the TVMs, to the network device and to the hypervisor;
        monitor memory-access requests issued by the network device to the external memory;
        check for each monitored memory-access request issued by the network device whether the monitored memory-access request is to a memory segment allocated to the network device issuing the request in the tracked allocation messages; and
        deny: (i) memory-access requests issued by the TVMs to the memory space allocated to the network device or to the memory space allocated to the hypervisor, (ii) memory-access requests issued by the network device to the memory space allocated to the TVMS or to the memory space allocated to the hypervisor, and (iii) memory-access requests issued by the hypervisor to the memory space allocated to the TVMs or to the memory space allocated to the network device.

2. The CC apparatus according to claim 1, wherein the memory-access requests comprise Direct Memory Access (DMA) accesses to the external memory.

3. The CC apparatus according to claim 1, wherein the TVMM is to decide whether to permit or deny a memory-access request based on (i) an address in the external memory that is accessed by the memory-access request, and (ii) an identifier that is specified in the memory-access request and identifies a software that originated the memory-access request.

4. The CC apparatus according to claim 1, wherein the TVMM additionally tracks deallocation messages.

5. The CC apparatus according to claim 1, wherein the TVMM updates an allocation table responsive to the tracked allocation messages, and uses the allocation table to check whether requests are to a memory segment allocated to the TVMs issuing the requests.

6. The CC apparatus according to claim 1, wherein the TVMM monitors memory-access requests on a system bus of the CC apparatus.

7. The CC apparatus according to claim 1, wherein the TVMM checks whether the tracked allocations collide.

8. The CC apparatus according to claim 7, wherein the TVMM notifies a Trusted Security Environment Security Manager (TSM) when tracked allocations to TVMs collide, and aborts the CPU when a collision between tracked allocations pertains to allocation of memory to the hypervisor.

9. The CC apparatus according to claim 1, wherein the TVMM further monitors memory-access requests issued by the hypervisor and checks whether the requests issued by the hypervisor are to a memory segment allocated to the hypervisor.

10. The CC apparatus according to claim 9, wherein the TVMM aborts the CPU when a memory-access request is to a memory segment not allocated to the TVM issuing the request, and aborts the CPU when a request issued by the hypervisor is not to a memory segment allocated to the hypervisor.

11. The CC apparatus according to claim 1, wherein the TVMM tracks allocation messages by monitoring system calls of the hypervisor.

12. A confidential computing (CC) method, comprising:
running, in a CPU, a hypervisor that hosts one or more Trusted Virtual Machines (TVMs); and
using a TVM-Monitor (TVMM) distinct from the hypervisor, running in the CPU:
  performing management operations on the one or more TVMs;
  tracking allocation messages of memory space, which is allocated in an external memory, by the hypervisor, to the TVMs, to the hypervisor and to a network device;
  monitoring memory-access requests issued by the network device to the external memory;
  checking for each monitored memory-access request issued by the network device whether the monitored memory-access request is to a memory segment allocated to the network device issuing the request in the tracked allocation messages; and
  denying: (i) memory-access requests issued by the TVMs to the memory space allocated to the network device or to the memory space allocated to the hypervisor, (ii) memory-access requests issued by the network device to the memory space allocated to the TVMS or to the memory space allocated to the hypervisor, and (iii) memory-access requests issued by the hypervisor to the memory space allocated to the TVMs or to the memory space allocated to the network device.

13. The method according to claim 12, wherein the memory-access requests comprise Direct Memory Access (DMA) accesses to the external memory.

14. The method according to claim 12, wherein denying the memory-access requests comprises deciding whether to permit or deny a memory-access request based on (i) an address in the external memory that is accessed by the memory-access request, and (ii) an identifier that is specified in the memory-access request and identifies a software that originated the memory-access request.

* * * * *